March 31, 1942.    A. S. BEHRMAN    2,278,053
PREPARATION OF HALIDES
Filed Jan. 19, 1938
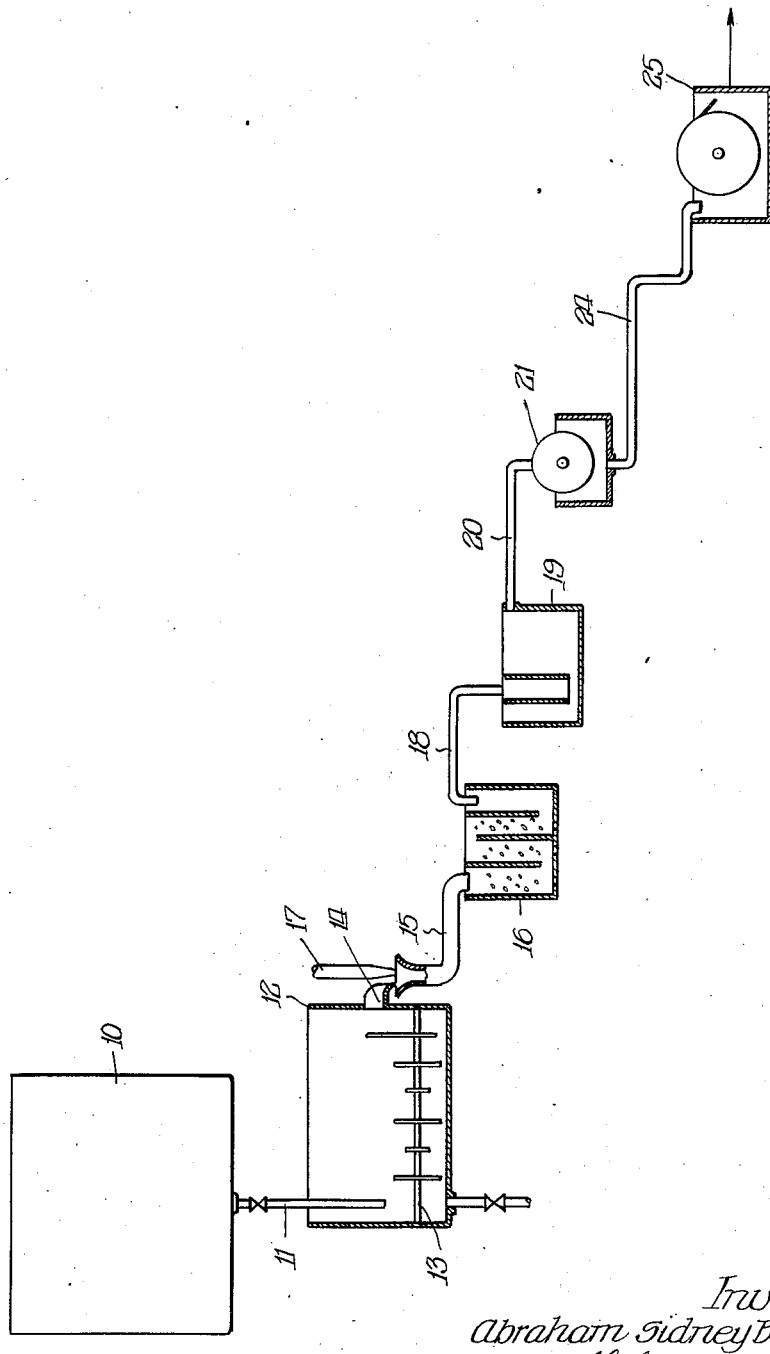
Inventor:
Abraham Sidney Behrman,
By Cromwell, Greist + Warden.
Attys Patented Mar. 31, 1942

2,278,053

UNITED STATES PATENT OFFICE 2,278,053

PREPARATION OF HALIDES

Abraham Sidney Behrman, Chicago, Ill.

Application January 19, 1938, Serial No. 185,655

6 Claims. (Cl. 204—94)

The present invention relates to the formation of compounds of iodine, bromine and chlorine, and has as a principal object an improved process for the production of salts of these halogens directly from the elements.

An additional object is the provision of a process for producing a chemical reaction of elemental halogens and compounds containing a cation with which it is desired to combine the halogen, and subjecting the reaction product to the action of a couple produced by a metal, the oxide or hydroxide of which is insoluble, and a carbon of a type capable of galvanic action with the metal in the presence of an aqueous solution of an electrolyte.

Another object is to produce halogen compounds from elemental halogens and compounds of the substance with which it is desired to combine the halogens, by contacting an aqueous mixture thereof with iron and activated carbon.

A still further object is the production of alkali metal or alkaline earth halides by reaction of elemental halogens with alkaline compounds thereof and subjecting the reaction product to a reducing galvanic couple produced by a galvanic carbon and a metal such as iron.

These and other objects will be evident upon consideration of the following description of a preferred embodiment of the invention and by reference to the accompanying drawing, in which the single figure is a diagrammatic view of apparatus suitable for carrying out my improved process.

For purposes of explanation, the improved process will be described in connection with the production of potassium iodide from elemental iodine and potassium hydroxide.

In the schematic apparatus shown in the drawing an aqueous mixture of potassium hydroxide and iodine is placed in the tank 10. The solution is prepared by adding 48 parts of potassium hydroxide to 1,000 parts of water and adding to the water 100 parts of iodine. From the tank 10 the solution passes through line 11 to the tank 12 in which is established a galvanic couple between activated carbon and iron borings, preferably in powdered form.

Within the tank 12 is an agitator 13 which maintains the particles of activated carbon and powdered iron borings in moving proximity in the electrolyte solution. The tank is filled with the potassium hydroxide and iodine solution substantially up to the overflow spout 14 and the agitator is set in motion. After the solution has been properly agitated it loses its brown color, evidencing a loss of elementary iodine. It is preferred to continue the agitation of the solution in the presence of the galvanic couple until a test sample of the solution does not show a yellow color when acidified, thus showing the absence of iodate. The process may be made continuous by the relatively slow addition of the solution through line 11 to the galvanic couple, the already reacted solution passing over the overflow spout 14 from the relatively quiescent zone at the opposite end of the tank 12. In this case sufficient time will be afforded for the completion of the reaction by the time the solution traverses the tank. As the solution leaves the spout 14 it enters a conduit 15 which transfers it to an aerating chamber 16. There is added to the solution through line 17 a sufficient quantity of potassium hydroxide to make the solution alkaline to phenolphthalein. As the liquid passes through the chamber 16 air is blown through it to oxidize any soluble ferrous iron to insoluble ferric hydroxide. From the aeration chamber 16 the liquid passes through line 18 to a settling chamber 19 where the ferric hydroxide separates out. The solution then passes through line 20 to a rotary filter 21 for further purification. The filtrate from the rotary filter 21 may be purified in various ways. As shown, the filtrate passes through line 24 to a drum or spray dryer 25. Thereafter the dried material is pulverized and packaged in the usual manner.

In order to understand the operation of the process it is of interest to note the reactions involved. The potassium hydroxide and iodine solution in the tank 10 enter into a reversible reaction forming an equilibrium mixture including as reaction products potassium hypoiodite, potassium iodide and water. In standing the potassium hypoiodite tends to be converted rather rapidly into potassium iodide plus potassium iodate. Under the influence of the couple in which the activated carbon and iron react with water the potassium iodate and hypoiodite are reduced to potassium iodide. This latter reaction is clear-cut and complete under the conditions of the process. The aeration converts the soluble ferrous hydroxide produced by the couple into insoluble ferric hydroxide which precipitates.

It is not always necessary to add additional potassium hydroxide through the line 17 since the amount of potassium hydroxide initially used may be sufficient to render the solution alkaline to phenolphthalein. The excess alkalinity prevents decomposition of the iodide and insures complete removal of Fe upon aeration, but if a pure product is not required the process may be operated at a lower pH. Thus the filtrate passing through the filter 21 contains potassium iodide and a slight excess of the free alkali. For many uses it is not necessary to remove the free alkali from the potassium iodide of the final product. For example, in cattle feeds there is no necessity for removing the small quantity of potassium hydroxide and the two may be recovered together in the dryer 25.

Where it is desired to make a more pure potassium iodide the filtrate from the filter 21 may be evaporated, crystallized and centrifuged to remove the potassium hydroxide, the iodide being recovered in commercially pure form and of a standard at least equal to the grade designated as "U. S. P."

It is not essential that the compound reacted with the iodine be the hydroxide. In the case of potassium, the alkali carbonates and bicarbonates may be employed. The alkaline earth hydroxides may be utilized in the process. In general, any compound which forms a soluble iodate or hypoiodite or equivalent compound may be utilized.

Other compounds of iodine will be prepared in the same manner described with respect to the preparation of potassium iodide. Also, compounds of other halogens such as bromine and chlorine will be prepared in this manner. In each case the compound of the cation with which it is desired to form a salt with the halogen is combined with any elementary halogen in the presence of the couple produced by the galvanic carbon and metal. Iron has been used as an example of the metal, due to its cheapness and other incidental advantages, but other metals likewise may be employed.

Another way of producing the reaction between the potassium hydroxide and iodine to form potassium iodide consists in percolating the solution through a bed of iron turnings and granular activated carbon. While this process is quite effective chemically, it is open to the practical objections that the formation of ferric hydroxide tends to foul and clog the bed; that an excessive amount of ferrous compounds is formed, making necessary the subsequent removal of the iron from the solution; that the galvanic action of the couple proceeds even though no solution is being passed through the bed, as long as the bed is sufficiently moist to permit the galvanic action; that it is difficult readily to renew the supply of iron for the couple; and that the activated carbon may retain a substantial quantity of the relatively valuable halide solution.

In the continuous process of the formation of halides as described herein the particles of iron are somewhat heavier than the particles of carbon and settle almost immediately upon cessation of the agitation in tank 12. This minimizes the contact of the iron and the carbon during periods of shut-down, as may be observed by the appearance of blue ferrous hydroxide at the bottom of the tank only. Furthermore, there is no mechanical difficulty due to fouling or cementation during the stirring period. In some cases it will be found desirable to utilize a third and inactive substance having intermediate specific gravity which will allow it to settle as an insulating layer between the carbon and the iron so as to arrest the galvanic action except during periods of agitation. Silica gel is a material of this type. The particles are adjusted in size so that they will settle in the desired strata.

In the continuous process of forming the halides and where the relatively pure material is obtained by evaporation, crystallization and centrifuging, it is possible to return the mother liquor to the tank 10 for make-up with additional halogen mixture. This results in the recovery of the excess potassium hydroxide as well as residual quantities of the halide.

The particular quantities of the materials employed may depend to some extent upon their molecular weights. A wide range of halides may be produced in accordance with the process. For example, the iodides, bromides and chlorides of sodium, potassium, ammonia, calcium, barium, and strontium may be prepared as described. In practice, the process operates highly satisfactorily and has many advantages over the processes of forming halides known heretofore. The materials employed in the process are quite inexpensive. Activated carbon has been specified as the material used in forming the couple, although certain other forms of carbon such as some electrode carbons have a similar galvanic action with respect to metals. As iron is one of the cheapest metals it is desirable for use in forming the couple. The equipment necessary for carrying out the process is quite simple and I am able to produce halides of high purity at a lower cost than is possible with the processes known prior to my invention.

A further, although less preferred, method of employing the galvanic couple between the iron and activated carbon consists in forming a solution of iodine in potassium iodide and subjecting this solution to the action of a couple, as described herein. The couple has a reducing effect upon the elemental iodine and the resulting reaction product may be treated with potassium hydroxide to form additional potassium iodide. The process then may be completed as described. Other halogen compounds may be prepared in a similar manner.

It will be recognized that many changes may be made in the process as described herein and such changes are intended to be included in the appended claims.

I claim:

1. The process of producing halides which comprises reacting a water solution of a soluble alkaline compound from the group consisting of alkali and alkaline earth metal hydroxides, carbonates and bicarbonates, with an elemental halogen thereby forming an oxyhalogen compound of said metal, and reducing said oxyhalogen compound by subjecting the solution to the direct contact action of numerous galvanic couples produced by carbon and iron, then separating the solution of the halide from the insoluble material of the reaction mixture.

2. The process of producing halides which comprises reacting a water solution of a soluble alkaline compound from the group consisting of alkali and alkaline earth metal hydroxides, carbonates and bicarbonates, with an elemental halogen thereby forming an oxyhalogen compound of said metal, and reducing said oxyhalogen compound by subjecting the solution to the direct contact action of numerous galvanic couples produced by carbon an iron, oxidizing and precipitating any residual dissolved iron by subjecting the solution to aeration, and then separating the solution of the halide from the insoluble material of the reaction mixture.

3. A process according to claim 1 in which the carbon employed in the carbon-iron couple is activated carbon.

4. A process for producing potassium iodide which comprises reacting a water solution of a compound from the group consisting of potassium hydroxide, carbonate and bicarbonate, with iodine thereby forming an oxygenated iodine compound of potassium, and reducing said oxygenated iodine compound by subjecting the solution to the direct contact action of numerous couples produced by carbon and iron, oxidizing and precipitating any residual dissolved iron by subjecting the solution to aeration, separating the solution of potassium iodide from the insoluble material of the reaction mixture, and recovering potassium iodide from said solution.

5. The process of producing halides which comprises reacting a water solution of a soluble alkaline compound from the group consisting of alkali and alkaline earth metal hydroxides, carbonates and bicarbonates, with an elemental halogen thereby forming an oxyhalogen compound of said metal, and reducing said oxyhalogen compound by subjecting the solution to the direct contact action of numerous galvanic couples produced by carbon and iron, oxidizing and precipitating any residual dissolved iron by subjecting the solution to aeration, separating the solution of the halide from the insoluble material of the reaction mixture, and recovering the halide from said solution.

6. The process of producing halides which comprises reacting a water solution of a soluble alkaline compound from the group consisting of alkali and alkaline earth metal hydroxides, carbonates and bicarbonates, with an elemental halogen thereby forming an oxyhalogen compound of said metal, and reducing said oxyhalogen compound by subjecting the solution to the direct contact action of numerous galvanic couples produced by carbon and iron, oxidizing and precipitating any residual dissolved iron by subjecting the solution to aeration, separating the solution of the halide from the insoluble material of the reaction mixture, crystallizing a substantial portion of the halide from said solution, and returning the mother liquor to the start of the process.

ABRAHAM SIDNEY BEHRMAN.